United States Patent [19]

Matthiessen

[11] 4,133,112
[45] Jan. 9, 1979

[54] APPARATUS FOR MEASURING A WORKPIECE

[75] Inventor: Otto Matthiessen, Munich, Fed. Rep. of Germany

[73] Assignee: Bayerische Motoren Werke Aktiengesellschaft, Fed. Rep. of Germany

[21] Appl. No.: 767,336

[22] Filed: Feb. 10, 1977

[30] Foreign Application Priority Data

Feb. 14, 1976 [DE] Fed. Rep. of Germany ... 7604351[U]

[51] Int. Cl.² .............................................. G01B 5/02
[52] U.S. Cl. .................................. 33/169 R; 33/1 M; 33/174 R
[58] Field of Search ................ 33/1 M, 169 R, 172 R, 33/172 B, 174 R, 174 Q, 174 M, 174 H

[56] References Cited

U.S. PATENT DOCUMENTS

| 2,737,725 | 3/1956 | Vines et al. | 33/174 R |
| 2,941,303 | 6/1960 | Middlestadt | 33/174 R |
| 3,100,346 | 8/1963 | Cannon | 33/169 R |
| 3,129,512 | 4/1964 | Schiler | 33/169 R |
| 3,846,917 | 11/1974 | Blakey | 33/172 R |

OTHER PUBLICATIONS

Portage Double-Quick, "A Revolutionary New Layout Method", 9-1961.

Primary Examiner—Richard R. Stearns
Attorney, Agent, or Firm—Craig & Antonelli

[57] ABSTRACT

Apparatus for measuring a workpiece which includes a support structure for carrying a longitudinally displaceable guide carriage, which guide carriage in turn carries a measuring feeler. To accommodate precise measurement of relatively large objects, without the requirement of an excessively large and heavy single support structure for the longitudinally displaceable guide carriage, the support structure is formed of a plurality of identical support elements. Each of the support elements are provided at the respective opposite end plates with mounting pins and recesses interengagable in a force form-fitting manner so as to align and connect the support elements in a precise location relative to one another. The end plates of the support elements are provided with grooved bracket structure to accommodate passage of the carriage past the junction of two support elements.

17 Claims, 2 Drawing Figures

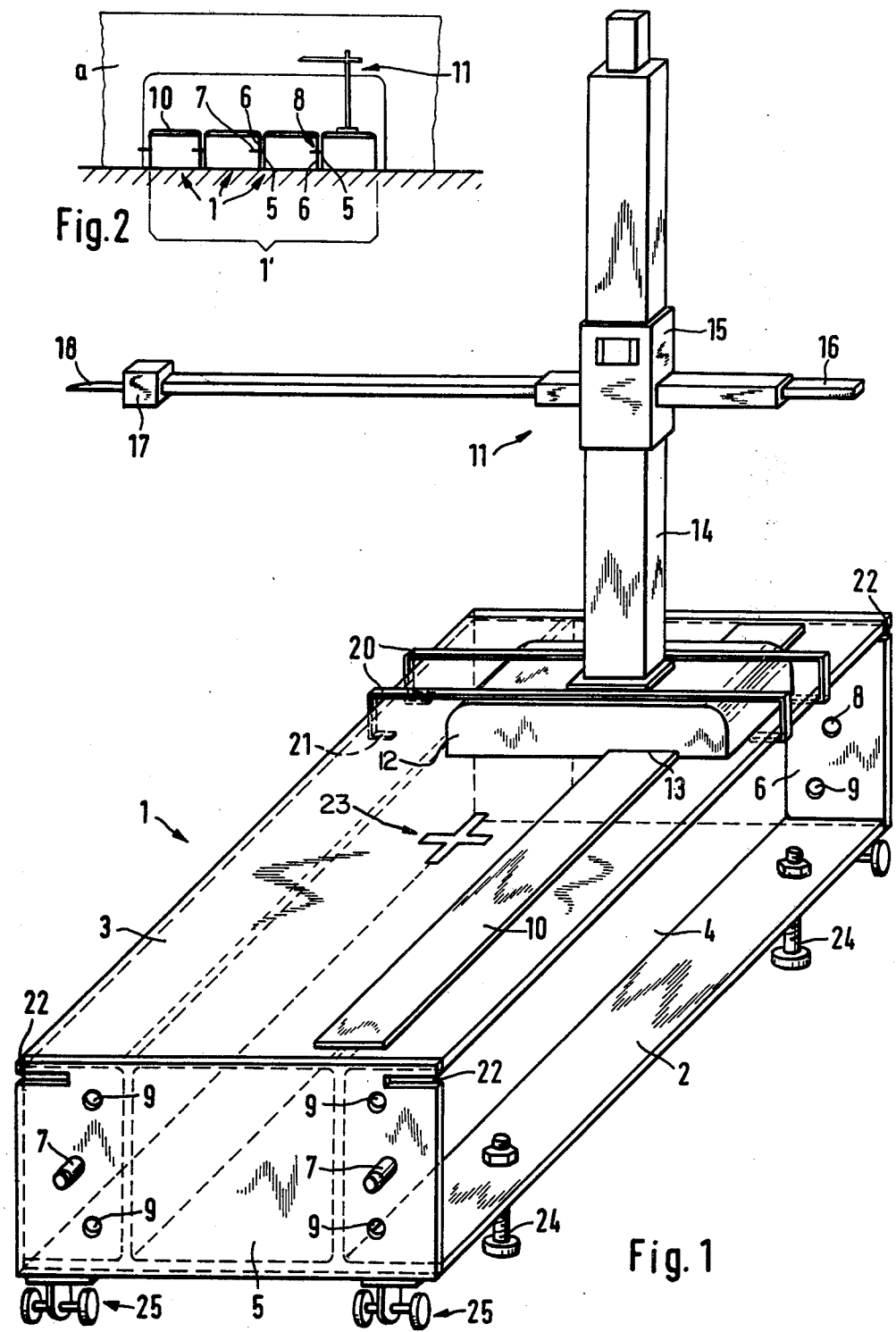

APPARATUS FOR MEASURING A WORKPIECE

BACKGROUND AND SUMMARY OF THE INVENTION

The present invention relates to an apparatus for measuring a workpiece of the type consisting essentially of a supporting element and a longitudinally displaceable guide carriage carrying a measuring feeler.

An exact measuring of a workpiece in more than one coordinate direction is conducted, as is known, most economically on a measuring plate by means of a gauge. However, in such a procedure, a measuring length can only be attained maximally which corresponds approximately to the length of the measuring plate. Objects of a very voluminous construction and objects which are fixedly mounted are in many cases measured by means of gauges, templates, castings, or the like. Since, as can be readily understood, considerable expenditures from the labor and money viewpoints are required for the manufacture of such devices, portable measuring devices have been created.

A portable measuring apparatus as has been disclosed, for example, in DOS [German Unexamined Laid-Open Application] 1,548,352 consists substantially of a casing and a yardstick longitudinally displaceable therein. However, a disadvantage of this measuring device, which can be arranged at the object to be measured, is that only a relatively minor measuring length corresponding to the length of the yardstick can be obtained.

Starting with this aspect, the present invention is based at least in part on the objective of providing a portable measuring device making it possible in a simple and economical manner to measure objects to be gauged which include those having great measuring lengths.

The present invention contemplates providing at least one end zone of a supporting element with a mounting means by which the supporting element can be connected with at least one further identical supporting element in a force-derived and/or form-fitting coupling fashion.

In a further development of the invention, the supporting element is equipped at both end zones with a mounting means.

The advantage of this invention resides particularly in that a supporting element constructed in this way can be connected to a number of additional similar supporting elements so that a series of supporting elements of an arbitrary length and forming a single structural unit can be composed in a rapid and accurate manner, whereby a very great measuring length can be attained by means of a measuring device attached to this structural unit.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 is a perspective schematic view which shows a single supporting element with a measuring device constructed in accordance with a preferred embodiment of the present invention; and FIG. 2 shows several supporting elements coupled at their end faces with each other to form a structural unit, the latter being arranged at a workpiece.

DETAILED DESCRIPTION OF THE DRAWINGS

As shown in FIG. 2, respectively one supporting element 1 is equipped at both of its end zones at the end faces with a mounting or attachment means. The attachment means consists, on the one hand, of mating elements 7 inserted in an end plate 5 of the supporting element 1 and, on the other hand, of recesses 8 provided in an opposed end plate 6 of the next adjacent supporting element 1. By means of the attachment means at least two supporting elements 1 can be detachably joined together, the end plates 5 and 6 facing each other and the mating elements 7 engaging the recesses 8. Advantageously, the supporting element 1 according to this invention furthermore affords the possibility of coupling an actually arbitrary number of supporting elements 1 together by a plug-in connection. The mutually facing end plates 5 and 6 of the supporting elements 1 are connected by screws, brackets, or the like, so that a rigid unit is produced, on which a measuring device 11 to measure a workpiece a can be disposed to be longitudinally displaceable. The supporting member 1' illustrated as a total unit in FIG. 2 is subdivided, so to speak, into several supporting elements 1 detachably joined together by fastening means in a force-derived and/or form-fitting connection.

A supporting element 1, illustrated individually with a generally rectangular box-like shape in FIG. 1, consists essentially of a base plate 2 and a top plate 3 connected via two members 4. The supporting element 1 may also have a square box-like shape. The supporting element 1 is preferably fashioned as a cast or welded construction. The mating elements 7 inserted in the first end plate 5 are aligned with the recesses 8 provided in the second end plate 6. The fitting dimensions of these recesses 8 are such that a fitting element having the same dimensions as the mating elements 7 can be introduced into any of the recesses 8 with the establishment of a sliding seat, i.e. in a force-derived connection. The mating elements 7 are preferably fashioned as mating pins, mating screws, mating springs, or the like. In the zone of the mating elements 7 and the recesses 8, respectively two continuous bores 9 are provided which likewise are in alignment with each other (with corresponding bores 9 on the end plate of the next adjacent supporting element 1) and serve for the threaded connection by bolts or the like (not shown) of the mutually adjoining end plates 5 and 6.

On the topside of the top plate 3, a guide rail 10 with a measuring scale is attached and extends substantially over the entire length of the supporting element 1. A guide carriage 12 carrying a measuring device 11 has a recess 13 on its underside cooperating with the guide rail 10. The measuring device 11 consists essentially of a column 14 inserted in the guide carriage 12 and a receiving part 15 wherein a measuring rod 16 is disposed to be longitudinally displaceable. At the free end of the measuring rod, a receiving head 17 is mounted. A measuring feeler 18 or the like is inserted in the receiving head.

The guide carriage 12 is equipped with two brackets 20 extending essentially over the entire width of the top plate 3 and extending underneath the latter by way of sections 21 at the marginal zone of the two longitudinal edges of the top plate. Thereby, the tilting of the measuring device 11 in case of shifts in the balanced position of the measuring sleeve 16 is prevented. In order to ensure, with a number of supporting elements 1 coupled together at the end faces, that in case of a longitudinal displacement of the guide carriage 12 the bracket sections 21 can be passed through at the junction of end plates 5 and 6, respectively, the latter are provided each with recesses 22 in their upper zone. In place of the brackets 20, it is also contemplated to arrange other fastening means, such as screws or the like, for example, which are connected to the supporting element 1.

To effect a rapid leveling of the supporting element 1, the latter is equipped with bubble levels 23 on its topside, which levels extend, on the one hand, in the longitudinal direction and, on the other hand, in the traverse direction of the supporting element 1.

On the bottom plate 2 of the supporting element 1, a vertical adjustment device is provided consisting of setscrews 24. Casters 25 are arranged on the underside of the supporting element 1 to facilitate the transporting of a heavy supporting element.

It is, or course, contemplated by other preferred embodiments of this invention to insert any other type of tool in the measuring device, for example, a scriber or the like.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Apparatus for measuring a workpiece comprising:
a support structure, formed by a plurality of support elements, each of said support elements having two opposite end plates,
a guide carriage carried by said support structure,
means for longitudinally displacing said guide carriage along said support structure,
a measuring feeler carried by said carriage,
mounting means, arranged on at least one of said end plates, for detachably connecting one of said support elements with a second support element, and
bracketing means mounted on the guide carriage, for stabilizing said guide carriage, said bracketing means extending over the entire upper surface of a top plate of the support element and extending beneath the top plate on opposite edge areas thereof by way of end sections of said bracketing means,
wherein the end plates are each provided with recesses to allow the end sections of the bracketing means to pass through and slide along the underside of the top plate.

2. Apparatus according to claim 1, wherein the support element is provided at both end plates with said mounting means.

3. Apparatus according to claim 1, wherein each support element is shaped to define a rectangular box.

4. Apparatus according to claim 1, wherein said mounting means includes a plurality of mating elements projecting from a face of a first end plate of the one of said support elements, whereas the face of the opposite end plate of the second support element connected thereto is provided with correspondingly associated aperture means for accommodating said mating elements.

5. Apparatus for measuring a workpiece comprising:
a support structure, formed by a plurality of support elements,
a guide carriage carried by said support structure,
means for longitudinally displacing said guide carriage along said support structure,
a measuring feeler carried by said carriage,
mounting means for detachably connecting one of said support elements with a second support element,
wherein each support element is shaped to define a rectangular box and is provided at each of its two end sides with an end plate carrying the mounting means,
wherein bracketing means for stabilizing the guide carriage are attached to said guide carriage, said bracketing means extending over the entire width of a top plate of the support element and extending underneath the top plate by way of end sections of said bracketing means at the marginal zone of the two longitudinal edges of the top plate, and wherein the two end plates of the support element each have recesses so that the bracketing means sliding along the underside of the top plate can pass therethrough.

6. Apparatus according to claim 5, wherein each support element is shaped to define a rectangular box.

7. Apparatus for measuring a workpiece comprising:
a. support structure formed by a plurality of support elements each having a top portion;
b. means for interconnecting said plurality of support elements;
c. a guide carriage carried by said support structure;
d. means for longitudinally displacing said guide carriage along said support structure;
e. bracketing means for stabilizing the guide carriage, carried by said guide carriage, said bracketing means extending over the entire upper surface of a top plate of one of said support elements and extending beneath the top plate on opposite edge areas thereof by way of end sections of said bracketing means; and
wherein each of the support elements have end plates provided with guide means for allowing the end sections of the bracketing means to pass through and slide along to the underside of the adjacent top plate.

8. Apparatus according to claim 7, wherein each support element is shaped to define a rectangular box.

9. Apparatus according to claim 7, wherein said interconnecting means includes a plurality of mating elements projecting from a face of a first end plate on a support element, whereas the face of the opposite end plate of a second support element connected thereto is provided with correspondingly associated recesses for accommodating said plurality of mating elements.

10. Apparatus according to claim 7, wherein said guide means each have a corresponding recess so that the end sections of the bracketing means sliding along the underside of the top plate can pass therethrough.

11. Apparatus according to claim 7, wherein each of said plurality of support elements includes a base and caster means integrally mounted to the underside of the base for facilitating the transporting of each support element.

12. Apparatus according to claim 7, wherein said interconnecting means include mounting pins fixed to one end plate of a respective support element, said mounting pins being slidably insertable into apertures provided on the other end plate of a respective adjacent support element.

13. Apparatus according to claim 12, further comprising aligned apertures in each of said end plates for accommodating bolting together of said support elements after they are coupled together and aligned by way of said mounting pins and apertures.

14. Apparatus according to claim 7, further comprising rail means along which said guide carriage travels.

15. Apparatus according to claim 14, further comprising a measuring device carried by said guide carriage.

16. Apparatus according to claim 7, wherein said bracketing means is so configured as to prevent the tilting of the measuring device with respect to the top portions of said plurality of support elements during the travel of the guide carriage.

17. Apparatus according to claim 7, wherein each of the support elements have two opposite end plates and further wherein said support elements are aligned end-to-end.

* * * * *